UNITED STATES PATENT OFFICE.

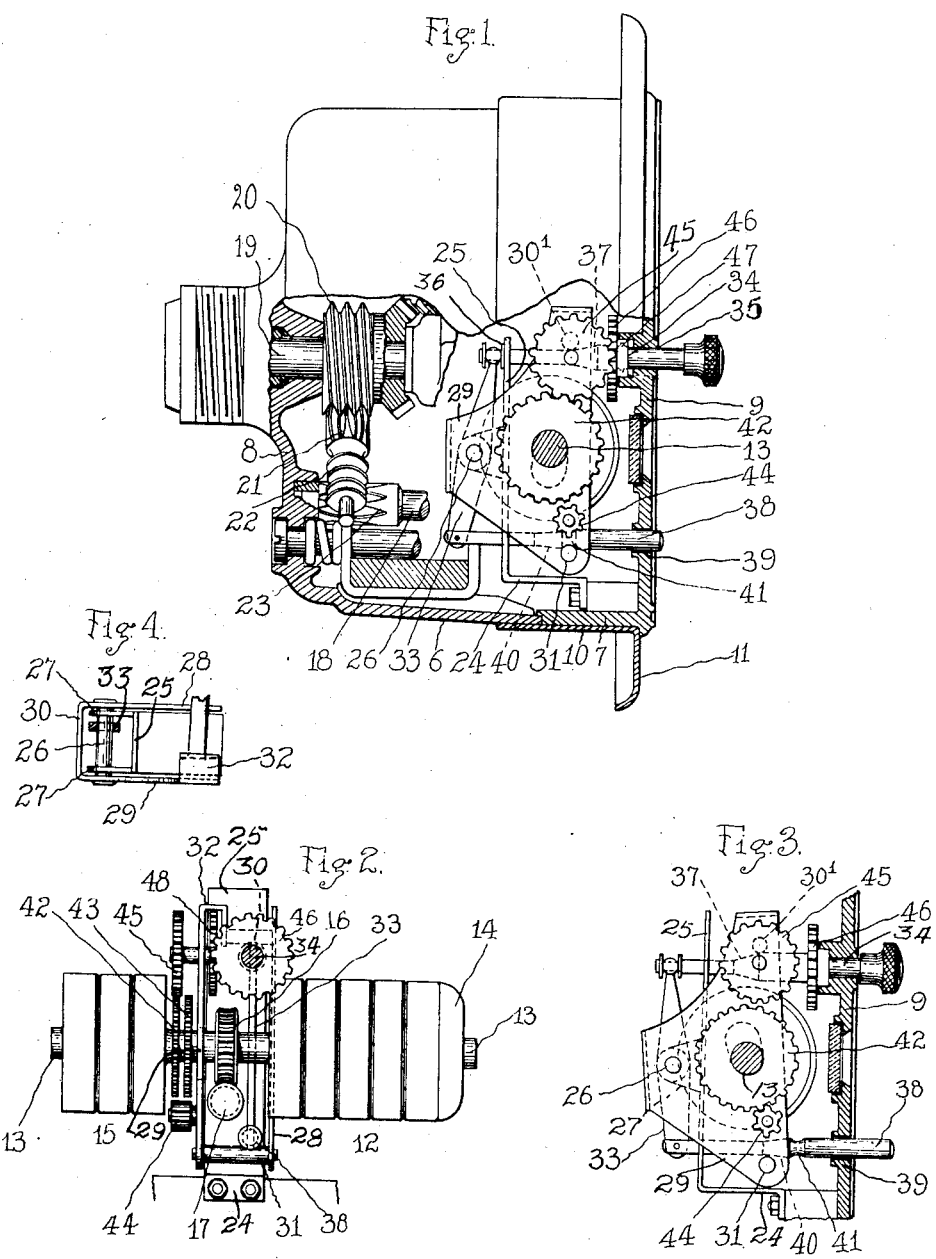

JOSEPH BERGE, OF FLINT, MICHIGAN, ASSIGNOR TO CHAMPION IGNITION COMPANY, OF FLINT, MICHIGAN, A CORPORATION OF MICHIGAN.

RESET MECHANISM.

1,358,817.   Specification of Letters Patent.   Patented Nov. 16, 1920.

Application filed April 14, 1919. Serial No. 289,830.

*To all whom it may concern:*

Be it known that I, JOSEPH BERGE, a citizen of the United States, and resident of Flint, Genesee county, State of Michigan, have invented certain new and useful Improvements in Reset Mechanism, of which the following is a specification.

My invention relates to odometers designed for use with vehicles to register the distance traveled thereby; the same being driven from a wheel of the vehicle and having a plurality of total or season wheels which record the total distance traveled, and a plurality of trip odometer wheels which may be reset to a zero reading at the end of each day or trip, or whenever it is desired to register the distance traveled by the vehicle independently of the record kept by the total wheels.

The object of the invention to which this present application relates is to provide improved resetting means or mechanism for resetting the trip odometer wheels to a zero reading wherever it is desired to do so.

With the above and such other objects of invention as will hereinafter appear, my invention consists in the improved resetting mechanism illustrated in the accompanying drawing described in the following specification, and particularly claimed in the concluding claims, and in such variations and modifications thereof as will be obvious to those skilled in the art to which my invention relates.

In the drawing accompanying and forming a part of this specification, and wherein the preferred embodiment of my invention is illustrated, although it will be appreciated that the invention may be embodied in various other forms so long as they come within the scope of the concluding claims:

Figure 1 is a view showing my improved resetting mechanism in side elevation and assembled within the casing of an odometer equipped therewith.

Fig. 2 is a view showing my invention in elevation and as seen from a position to the right of Fig. 1, the end wall of the casing of the instrument being omitted.

Fig. 3 is a view showing the resetting mechanism in side elevation as in Fig. 1, the parts thereof however being shown in different positions and;

Fig. 4 is a view showing the resetting mechanism in plan.

Referring to the drawing, the external shell or casing of the instrument within which the various parts thereof are supported in proper operative relation with one another may be of any form, so far as this present application is concerned, as the invention herein is in no way concerned with the structural features of the casing of the instrument. The casing shown, however, is made up of two cup-shaped casing sections 6, 7, annular in cross section and having end walls 8, 9 whereby a substantially cylindrical casing is provided, said sections being secured together by a securing band or sleeve 10 having a peripherally extending flange 11 whereby the instrument may be secured in place in an opening in the dash or instrument supporting board of the vehicle with which the odometer is used.

The total odometer wheels indicated collectively by the reference numeral 12 are supported from a rotatable odometer shaft 13, the ends of which are supported in suitable bearings carried by the casing wall; said wheels being operated from a driving member 14 driven by the said shaft, and any suitable carrying mechanism being employed to transmit motion from each wheel of a lower order of members to the next adjacent wheel of a higher order, as is usual in odometer mechanisms. Likewise the trip odometer wheels 15 are supported from the odometer shaft 13, and the right hand one of said wheels is driven in unison therewith, the other wheels of the trip odometer being operated from the first or driven wheel thereof, as will be understood.

The odometer shaft is driven by a pinion 16 with which a worm 17 upon an odometer driving shaft 18 engages, said last mentioned shaft being supported in bearings in the end walls 8, 9 of the casing, and the same being driven from the main driving shaft 19 of the instrument through a suitable gear train made up of the members 20, 21, 22 and 23 in mesh with one another, as shown.

Located within the casing of the instrument and held in place in any appropriate manner, as by means of an arm 24 at its lower end which is fastened to a lug or boss upon the inside of the casing, is an upright support 25 whereby the greater number of the elements of my improved resetting mechanism are supported in operative relation with the trip odometer wheels which they are adapted to reset.

Pivotally supported by a pivot 26 which in turn is supported by arms 27 extending from the support 25 is a swinging frame made up of two oppositely located side members 28, 29 preferably connected one with the other through a cross member 30 in order to increase the rigidity thereof; and the upper and lower ends of which side members are fastened together by spacing bars or struts 30′, 31; the upper end of the side member 29 being bent as shown at 32 in Fig. 2 to provide space for a gear there shown and to be hereinafter referred to.

The reference numeral 33 designates an oscillating lever supported by the pivot 26; and 34 designates a rotatable and reciprocating resetting member slidable and rotatable in bearings at 35, 36 in the end wall 9 and in the support 25, and the inner end of which is operatively connected with the upper end of the lever 33. This resetting member has a conical cam 37 which is so arranged as to engage the upper spacing bar or rod 30′, from which it follows that the frame as a whole will be swung upwardly about the pivot 26 when said resetting member is pushed to the left or into the casing.

Arranged below and parallel with the resetting member 34 is a push-rod 38 slidable in a bearing at 39 in the end wall 9, and the inner end of which rod is operatively connected with the lower end of lever 33. This push-rod is provided with a conical cam 40 so disposed as to engage the lower spacing rod or bar 31, from which it follows that the frame as a whole will be swung downwardly about the pivot 26 when said push-rod is pushed to the left or into the casing.

The lever 33 with which the inner ends of the resetting member and the push-rod are connected provides a construction whereby inward movement of either of said members is accompanied by outward movement of the other, and the conical cam of each member advances and acts against the cross rod 30′ or 31 to swing the frame at the same time that the conical cam of the other member moves away from the cross rod with which it coöperates, to thereby permit such swinging movement to occur, in the embodiment of my invention illustrated.

I regard my invention as comprehending the swinging frame in combination with rotatable and reciprocating resetting member for swinging the frame and for resetting the trip odometer wheels irrespective of the particular elements and features whereby swinging movement is imparted to the frame when the resetting member is moved along its axis, and have so claimed the same at the end of this specification. The push-rod 38 is shown as provided with a groove 41 into which the cross bar 31 enters at the end of the inward movement of the said rod, to thereby hold the rod in its innermost position and the swinging frame in the position which it then assumes with sufficient security to keep the parts in proper relation with one another while the trip odometer wheels are being reset.

The trip odometer wheel farthest to the right, Fig. 2, is driven by a gear 42 directly connected with the same; and 43 is a gear corresponding in diameter and number of teeth with the gear 42 and arranged adjacent the same, and which last mentioned gear is driven in unison with the odometer shaft 13 and the pinion 16 whereby the odometer mechanism as a whole is driven. The reference numeral 44 designates an idler pinion carried by the swinging frame and which when the parts are in the running position in which they are shown in Fig. 3 is in mesh with both the gears 42, 43 and serves to lock said gears together so that the trip odometer wheels will be driven from the pinion 16. When, however, the parts are in the positions in which they are shown in Figs. 1 and 2, the pinion 44 will be out of mesh with the gears 42, 43, and a resetting pinion 45 also carried by the swinging frame and which is normally out of mesh with the gear 42 will be moved into mesh with the said gear; whereupon and when said resetting gear is rotated motion will be communicated to the trip odometer wheels to reset them to a zero reading.

The resetting member 34 is movable longitudinally through a pinion 46, but is in constant driving engagement therewith through a keyway or groove 47 formed in the said resetting member and a key within the hub of the said pinion, so that the pinion may be rotated by rotating the said resetting member; and 48 designates a gear carried by the swinging frame and which is out of mesh with the pinion 46 when the parts are in the running position in which they are shown in Fig. 3, said last mentioned gear being permanently connected with the resetting gear 45 as through a common shaft to which both are secured. When, however, the push-rod 38 is pushed inward the resetting member 34 will be moved outward through the pinion 46, and by means of the lever 33; the cam 40 will advance relative to the cross-rod 31 simultaneously with a receding movement of the cam 37 from the cross-rod 30; and the swinging frame will be swung upon the supporting pivot 26 therefor and into the resetting position in which the parts are shown in Figs. 1 and 2. This swinging movement of the frame will move the idler pinion 44 out of mesh with the gears 42, 43, and the resetting gear 45 into mesh with the gear 42 and the gear 48 into mesh with the pinion 46; whereupon and when the resetting member 34 is rotated the right-hand wheel of the trip odometer will be driven through the pinion 46, the gear 48, the resetting gear 45, and the gear 42 which is connected with the said wheel, to thereby reset the trip odometer wheels to a zero reading, as follows from the disclosure of my invention hereinbefore occurring.

Having thus described and explained my invention, I claim and desire to secure by Letters Patent:

1. In odometer mechanism of the class described, a pivotally supported swinging frame; an idler pinion carried by said frame; a resetting gear carried by said frame; a reciprocating and rotatable resetting member operatively associated with said frame and whereby the same may be moved in one direction; means for moving said frame in a reverse direction; and gearing through which said resetting gear may be driven from said resetting member.

2. In odometer mechanism of the class described, a pivotally supported swinging frame; an idler pinion carried by said frame; a resetting gear carried by said frame; a reciprocating and rotatable resetting member operatively associated with said frame and whereby the same may be moved in one direction; means for moving said frame in a reverse direction; a pinion operable by said resetting member; and a gear carried by said frame and adapted to move into and out of engagement with said pinion as said frame is moved as aforesaid, and which gear is operatively connected with said resetting gear to drive the same.

3. In odometer mechanism of the class described, a pivotally supported swinging frame; an idler pinion carried by said frame; a resetting gear carried by said frame; a reciprocating and rotatable resetting member having a conical cam adapted to engage a portion of said frame and move the same in one direction; means for moving said frame in a reverse direction; and gearing through which said resetting gear may be driven from said resetting member.

4. In odometer mechanism of the class described, a pivotally supported swinging frame; an idler pinion carried by said frame; a resetting gear carried by said frame; a reciprocating and rotatable resetting member having a conical cam adapted to engage a portion of said frame and move the same in one direction; means for moving said frame in a reverse direction; a pinion concentric with said resetting member and driven therefrom, and through which pinion said member may move; and a gear carried by said frame and operatively connected with said resetting gear, and which last mentioned gear is moved into and out of mesh with the pinion operated by said resetting member as said frame swings about its pivotal support as aforesaid.

5. In odometer mechanism of the class described, a pivotally supported swinging frame; an idler pinion carried by said frame; a resetting gear carried by said frame; a reciprocating and rotatable resetting member having a conical cam adapted to engage a portion of said frame and move it in one direction; means for moving said frame in a reverse direction; a push-rod arranged parallel with said resetting member; a pivotally supported lever with which said resetting member and said push rod are connected; and gearing through which said resetting gear may be driven from said resetting member.

6. In odometer mechanism of the class described; a pivotally supported swinging frame; an idler pinion carried by said frame; a resetting gear carried by said frame; a reciprocating and rotatable resetting member having a conical cam adapted to engage a portion of said frame and move it in one direction; a push-rod arranged parallel with said resetting member and having a conical cam adapted to engage a portion of said frame and move the same in a reverse direction; a pivotally supported lever with which said resetting member and said push-rod are connected; and gearing through which said resetting gear may be driven from said resetting member.

7. In odometer mechanism of the class described, a pivotally supported swinging frame; an idler pinion carried by said frame; a resetting gear carried by said frame; a reciprocating and rotatable resetting member having a conical cam adapted to engage a portion of said frame and move the same in one direction; means for moving said frame in a reverse direction; a push-rod arranged parallel with said resetting member; a pivotally supported lever with which the ends of said resetting member and said push-rod are connected; a pinion operated by said resetting member; and a gear carried by said frame and movable therewith into and out of mesh with the pinion operated by said resetting member, and which gear is operatively connected with said resetting gear to drive the same.

8. In odometer mechanism of the class described, a pivotally supported swinging frame; an idler pinion carried by said frame; a resetting gear carried by said frame; a reciprocating and rotatable resetting member having a conical cam adapted to engage a portion of said frame and move it in one direction; a push-rod arranged parallel with said resetting member; a pivotally supported lever with which the ends of said resetting member and said push-rod are operatively connected; a pinion concentric with and driven from said resetting member and through which said member may move; and a gear carried by said frame and adapted to move into and out of engagement with said pinion as said frame is moved as aforesaid, and which gear is operatively connected with said resetting gear to drive the same.

9. In odometer mechanism of the class described, a pivotally supported swinging frame; an idler pinion carried by said frame; a resetting gear carried by said frame; a reciprocating and rotatable resetting member having a conical cam adapted to engage a portion of said frame and move it in one direction; a push-rod arranged parallel with said resetting member and having a conical cam adapted to engage a portion of said frame and move it in a reverse direction; a pivotally supported lever with which the ends of said resetting member and said push-rod are operatively connected; a pinion operated by said resetting member; and a gear carried by said frame and movable therewith into and out of mesh with the pinion operated by said resetting member, and which gear is operatively connected with said resetting gear to drive the same.

10. In odometer mechanism of the class described, a cup-shaped casing section having an end wall; a support carried by said section; a swinging frame pivotally supported by said support; an idler pinion carried by said frame; a resetting gear carried by said frame; a reciprocating and rotatable resetting member operable in a bearing formed in said end wall; means operable by longitudinal movement of said resetting member for moving said frame in one direction; means for moving said frame in a reverse direction; and gearing through which said resetting gear may be driven from said resetting member.

11. In odometer mechanism of the class described, a cup-shaped casing section having an end wall; a support carried by said section; a swinging frame pivotally supported by said support; an idler carried by said frame; a resetting gear carried by said frame; a reciprocating and rotatable resetting member operable in a bearing formed in said end wall; a reciprocating push-rod operable in a bearing formed in said end wall; a lever pivotally supported by said support and with which the ends of said resetting member and said push rod are operatively connected; a conical cam carried by said resetting member and adapted to engage said frame to move the same in one direction; means for moving said frame in a reverse direction; and gearing through which said resetting gear may be driven from said resetting member.

12. In odometer mechanism of the class described, a cup-shaped casing section having an end wall; a support carried by said section; a swinging frame pivotally supported by said support; an idler pinion carried by said frame; a resetting gear carried by said frame; a reciprocable and rotatable resetting member operable in a bearing formed in said end wall; a reciprocating push-rod operable in a bearing formed in said end wall; a lever pivotally supported by said support and with which the ends of said resetting member and said push-rod are operatively connected; a conical cam carried by said resetting member and adapted to engage said frame to move the same in one direction; means for moving said frame in a reverse direction; a pinion rotatable about the axis of said resetting member and with which said member is operatively connected; and a gear carried by said frame and movable into and out of mesh with the pinion operated by said resetting member, and which gear is operatively connected with said resetting gear to drive the same.

13. In odometer mechanism of the class described, an odometer shaft; an odometer wheel supported by and rotatable about the axis of said shaft; a driving pinion; two gears arranged side by side and rotatable about the axis of said shaft, one of said gears being driven in unison with said driving pinion and the other being operatively connected with said odometer wheel; a pivotally supported swinging frame; an idler pinion carried by said frame and movable therewith into and out of mesh with both said gears; a resetting gear carried by said frame and movable therewith into and out of mesh with the gear whereby said odometer wheel is driven; means for swinging said frame about its pivotal support; a rotatable resetting member; and gearing through which said resetting gear may be driven from said resetting member.

14. In odometer mechanism of the class described, an odometer shaft; an odometer wheel supported by and rotatable about the axis of said shaft; a driving pinion; two gears arranged side by side and rotatable about the axis of said shaft, one of said gears being driven in unison with said driving pinion and the other being operatively connected with said odometer wheel; a pivotally supported swinging frame; an idler pinion carried by said frame and movable therewith into and out of mesh with both said gears; a resetting gear carried by said frame and movable therewith into and out of mesh with the gear whereby said odometer wheel is driven; a reciprocating and rotatable resetting member operatively associated with said frame to swing the same about its pivotal support; and gearing through which said resetting gear may be driven from said resetting member.

15. In odometer mechanism of the class described, an odometer shaft; an odometer wheel supported by and rotatable about the axis of said shaft; a driving pinion; two gears arranged side by side and rotatable about the axis of said shaft, one of said gears being driven in unison with said driving pinion and the other being operatively connected with said odometer wheel; a pivotally supported swinging frame; an idler pinion carried by said frame and movable therewith into and out of mesh with both said gears; a resetting gear carried by said frame and movable therewith into and out of mesh with the gear whereby said odometer wheel is driven; a reciprocating and rotatable resetting member having a conical cam adapted to engage said frame to move the same in one direction; means for moving said frame in a reverse direction; a reciprocating push-rod; a pivotally supported lever with which the ends of said resetting member and said push-rod are operatively connected; a pinion operated by said resetting member; and a gear carried by said frame and movable therewith into and out of mesh with the pinion operated by said resetting member, and which gear is operatively connected with said resetting gear.

In testimony whereof I affix my signature.

JOSEPH BERGE.